Figures 1, 2:
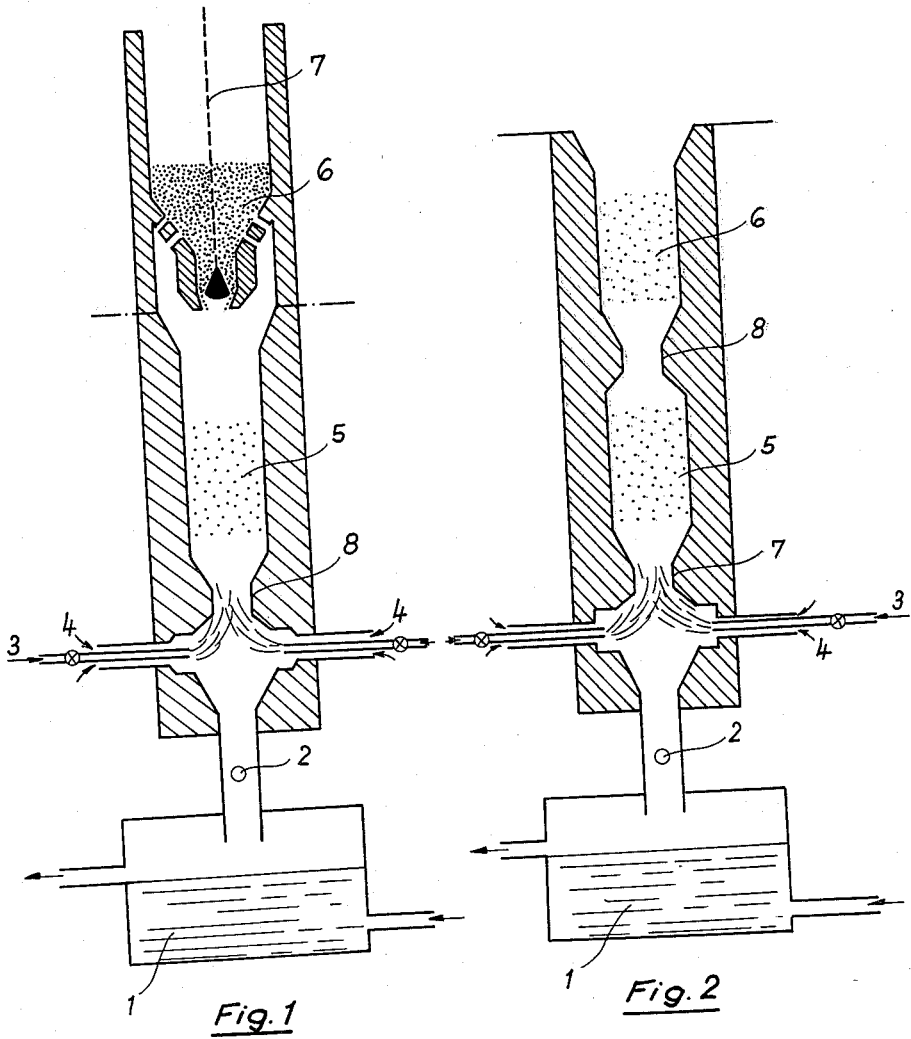

United States Patent Office 3,085,022
Patented Apr. 9, 1963

3,085,022
PROCESS AND APPARATUS FOR THE PRODUCTION OF CEMENT CLINKER, MORE ESPECIALLY FOR WHITE CEMENT
Anton Koch, Heidelberg, Germany, assignor to Portland Zementwerke Heidelberg A.G., Heidelberg, Germany
Filed July 11, 1960, Ser. No. 42,105
Claims priority, application Germany July 18, 1959
7 Claims. (Cl. 106—101)

The present invention relates to a new and improved process for the production of cement clinker, more especially for white cement.

As is known, rapid sintering and cooling during the calcining of Portland cement clinker is very desirable, because it is possible in this way to produce a cement with very good properties.

The known calcining apparatus such as rotary kilns and shaft kilns have however the disadvantage that the calcining and cooling speeds can only be influenced within comparatively narrow limits, which is effected in conformity with the specific capacity of the kiln by regulating the atmospheric air for combustion (secondary air).

The rapid cooling of the clinker is particularly important when producing white cement, which is produced from crude powders with a very low iron content, since it is desired to obtain a best possible white content in the colour tone of the cement. The cooling of Portland cement clinker intended for the production of white cement, which should proceed as far as possible with exclusion of atmospheric oxygen, should take place from highest possible temperature to lowest possible temperature. The procedure hitherto has consequently been for the white cement clinker to be generally conducted from the sintering zone of the rotary kiln in a glowing condition and by a shortest possible path into a trough filled with water, in which it is quenched.

This known process, the firing or calcining of white clinker in a rotary kiln, using the water quenching procedure, does not lead to a white clinker which can be considered as the best possible as regards the quality of its colour, since unavoidably colouring oxides such as for example iron oxide, manganese oxide and chromium oxide in visible traces are taken up by the kiln material due to the intensive contact of the latter with the glowing refractory lining of the rotary kiln during the rolling motion of the clinker in the calcining tube. The undesirable result is so-called rust spots, namely greenish or brownish spots on the clinker grain.

It has now been found that these disadvantages can be overcome in accordance with the invention. The process according to the invention for the production of cement clinker, more especially for white cement, is characterised by the fact that an initial raw powdered material shaped with water into granules having a grain size for example, 1–2 mm., or 2–3 mm., or 3–5 mm., or 5–7 mm., which is as uniform as possible is introduced intermittently into an ascending hot gas stream which is controlled or modulated in its flow velocity in accordance with and with respect to the grain size of said initially introduced material and at the temperature causing the sintering, is held in suspension in the said stream until the sintering occurs and then by throttling the flow velocity of the hot gas stream, the sintered material is removed from the latter by falling by gravity for quenching or cooling. During the step of holding the granular material in suspension in the hot gas stream, the flow velocity of the hot gas is so regulated that the granules in the firing tube are held in suspension at the sintering temperature, viz 1400–1500° C., until completely sintered, and it is quite apparent that the complete sintering can be attained within three to five minutes. By throttling, or reducing, the flow velocity of the hot gas, the sintered, or clinkered, material is rapidly removed by gravity from the firing, or combustion chamber for quenching or cooling.

Any initial material known for the production of cement is suitable as the initial material for the process according to the invention. In the case where starting substances containing carbonate are used, a calcining process takes place before the sintering process. According to one preferred form of the invention, the initial material is first of all preheated in one of the conventional heat exchangers (for example a cyclone, travelling grate or fluidized bed), a more or less complete dehydration being perhaps achieved, which is then perhaps completed by the contact of the initial material with the hot gas stream. As is clearly apparent, the raw material used in carrying out the method of this invention can be any raw powdered material suitable for the manufacture of presently known so-referred to white Portland cement.

The sintering and the cooling process according to the invention proceeds more rapidly than with known roasting methods. In this way the patentably novel process of this invention makes it possible to avoid the protracted intimate contact of the powdered material being sintered with the refractory lining of the furnace and the resulting undesirable absorption of coloring metal oxides. As is clearly apparent, granular raw material having a particle size of from 3–5 mm., at a gas temperature of about 1450° C., using medium heavy fuel oil, will have a velocity of about five meters per second.

The cement produced by the process of the invention is distinguished in the first place by the surprising effect of a better setting power and by best possible colour quality. It is impossible with the known apparatus to achieve the sintering and cooling speed which is produced in the process of the invention. An additional advantage of the process according to the invention is one of thermal economy. It has in fact been shown that the process of the invention represents a heat-economizing factor because of the use of oxygen-enriched air for combustion or pure oxygen and the small volume of waste gas which is thereby obtained.

In order to achieve the desired rapid sintering of the kiln material, followed immediately by a quenching of the glowing clinker, the initial material fines shaped into uniformly small granules, after being preheated in a suitable heat exchanger, for example a travelling grate, and preferably one or more cyclones, is introduced according to the invention into a vertical firing tube lined with refractory material, dropping freely thereinto at predetermined time intervals which are automatically controlled according to the finish-burning time. One or preferably several firing nozzles are arranged in the lower half of the firing tube; these nozzles are most advantageously supplied with fuel gas or liquid fuels and, after ignition of the fuel, cause the setting up of a hot gas stream ascending in the firing tube, the said stream on the one hand holding the material in suspension and on the other hand calcining and sintering the said material. By brief throttling of the hot gas stream and simultaneously interrupting the supply of material to the kiln, the state of suspension of the sintered material is terminated. Consequently, the sintered material drops freely into a shaft which is for example filled with cold water. This cooling can in certain cases be effected with cold air or other gases, for example nitrogen.

Natural gas or petroleum or any other suitable solid, gaseous or liquid fuel can be used as the fuel in this case. When using solid fuels, those with a smallest possible ash content are to be preferred. The burning of these fuels in the firing nozzle, after being ignited, is operated at will with air, oxygen-enriched air or with pure oxygen. The burner nozzles in one preferred embodiment are so arranged radially in the lower part of the firing tube, i.e. below the firing zone, that they do not impede the free descent of the clinker. It has proved to be desirable to constrict the firing tube above the burner nozzles in order to be able better to maintain the state of suspension of the material being fired.

By regulating the flow velocity of the hot gases, it is possible to assure a satisfactory state of suspension of the material to be calcined and sintered. Generally speaking, the fired material has a density of 1 to 1.1 on leaving the preheating arrangement.

The upper part of the tube, in which the material is held in suspension, can be subdivided into an upper calcining zone and a lower sintering zone. The release of the carbon dioxide takes place quickly in the calcining zone and this represents an additional formation of waste gas. The velocity of the hot gas stream is adjusted in dependence on the density of the fired material, which is variable within certain limits, and also the total gas quantity in the calcining zone, so that the maintenance of the state of suspension of the fired material is assured. As the burning progresses, the material is finally sintered, after it has entered the lower sintering zone and acquires a density of about 1.4 to 1.6. In order now to maintain the state of suspension, the gas velocity must be somewhat higher because of the higher density; in order to assure these desired ratios, the vertically disposed firing tube is so constructed that the sintering zone thereof has a certain diameter which is smaller than the diameter of the firing tube in the superimposed calcining zone. Due to these different dimensions of the firing tube, the desired gas velocities are produced. A desirable increase in the hot gas velocity can be obtained by one or more constrictions of the firing tube diameter just above the burning nozzle.

After completing the firing process, the cooling of the material from a very high temperature to a very low temperature (quenching) is effected very suddenly by the fact that the hot gas stream coming from the burners is shut off and simultaneously there is a brief interruption in the supply of initial material. The sintered material drops freely into the water and is quenched. Immediately thereafter, the firing process is restarted.

In order to ensure that only material which is completely sintered drops into the water bath, the supply of the initial material is maintained up to a certain time in accordance with one preferred form of the process, and shortly thereafter the supply of hot gas is shut off and the quenching takes place. The result hereby obtained is that the sintering process is definitely completed.

Figure 3:
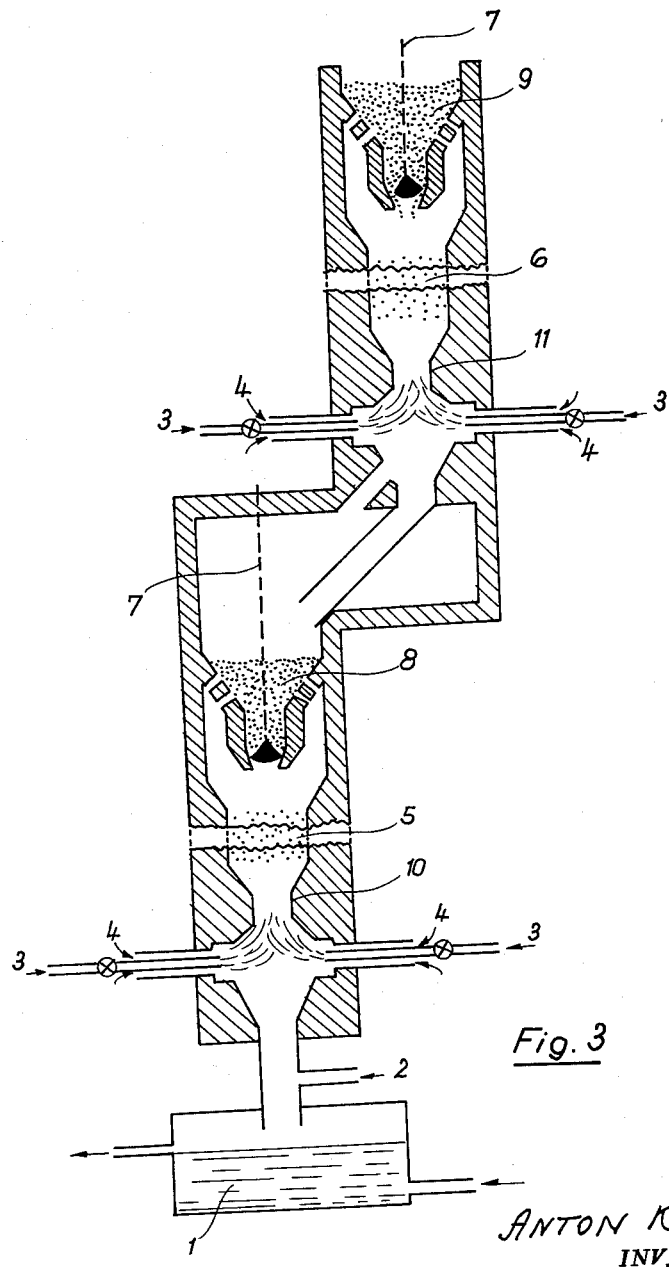

According to yet another preferred embodiment, as illustrated in FIGURE 3, a horizontal intermediate section is interposed between the upper and lower parts of the vertical firing tube. The supplied material coming from the heat exchanger is initially introduced into the upper vertical firing tube, in which first of all it is initially calcined. After shutting off or reducing the stream of hot air of the upper burner, the calcined material initially drops into the supply device for the lower firing tube and from thence into the said tube itself, in which the sintering process takes place.

The process in the firing arrangement shown in FIGURE 3 can be so conducted that the firing system in the upper firing tube is constantly in operation. By shutting off the firing or heating system in the lower firing tube, the effect is obtained that the calcined material drops into the delivery device for the lower tube because of the decrease in the gas quantity.

According to yet another embodiment of the invention, with the burning arrangement shown in FIGURE 3, the burner in the upper tube can be dispensed with.

The regulation of the required firing temperature is for example possible by altering the oxygen concentration of the air for combustion.

The accompanying FIGURES 1 to 3 show preferred embodiments of the apparatus for carrying out the process according to the invention.

FIGURE 1 represents the firing tube according to the invention, the diameter of which increases upwardly in the upper half. The reference 1 indicates the water trough or the quenching medium, 2 is the inlet point for secondary combustion air, 3 is the fuel inlet and 4 is the inlet for primary combustion air. The reference 5 shows the material disposed in suspension in the firing tube and 6 represents the preheating and calcining shaft filled with the granules of the crude powder. 7 represents the regulating member for the intermittent supply of material and 8 shows a constriction in the firing tube.

FIGURE 2 shows an embodiment of the firing arrangement according to the invention, in which the calcining zone and the sintering zone are separated from one another by a constriction. 1 represents the water trough or the quenching medium, 2 the inlet point for secondary combustion air, 3 the inlet for the fuel and 4 the inlet for primary combustion air. 5 shows the sintering zone and 6 the calcining zone, while 7 is the lower constriction in the firing tube and 8 is the upper constriction separating the calcining zone from the sintering zone.

FIGURE 3 shows another preferred embodiment of the firing arrangement according to the invention, this consisting of two vertical firing tubes offset from one another and having interposed supply and distributing devices. The reference 1 represents the water trough or the quenching medium, 2 the supply point for secondary combustion air, 3 the fuel inlet and 4 the inlet for primary combustion air. 5 shows the material in suspension in the lower firing tube and 6 the material in the upper firing tube. 7 represents the regulating member for the intermittent supply of material and 8 shows the lower container and 9 the upper container for the material being fired. 10 represents the constriction of the lower firing tube and 11 is the constriction in the upper firing tube.

I claim:

1. A process for producing cement clinker for white cement comprising intermittently introducing granular material of substantially uniform particle size into a countercurrently flowing hot gas stream, controlling the flow velocity of said hot gas stream in accordance with and with respect to the particle size of said granular material, the flow velocity of said hot gas stream and the particle size of said granular material being of such respective values that said granular material is held in suspension in said gas stream, said gas stream being at a sintering temperature, sintering said material in said gas stream while said material is suspended in said gas stream, reducing the flow velocity of said hot gas stream to a velocity such that the suspension of the so-sintered granular material in said gas stream is terminated, and causing said so-sintered granular material to drop into a non-oxidizing cooling medium.

2. The process of claim 1 wherein the cooling medium is cold water.

3. The process of claim 1 wherein the cooling medium is a cold inert gas.

4. A process for producing cement clinker for white cement comprising calcining granular material of substantially uniform particle size, intermittently introducing said so-calcined material into a countercurrently flowing hot gas stream, controlling the flow velocity of said hot gas stream in accordance with and with respect to the particle size of said calcined granular material, the flow velocity and the particle size of said material being of such respective values that said calcined granular material is held in suspension in said gas stream, said gas stream being at a sintering temperature, sintering said material in said gas stream while said material is suspended in said gas stream, reducing the flow velocity of said gas stream to a velocity such that the suspension of said material in said gas stream is terminated, and causing said so-sintered material to drop into a non-oxidizing cooling medium.

5. The process of claim 4 including the step of collecting said calcined material prior to introducing said calcined material into a countercurrently flowing hot gas stream.

6. The process of claim 5 including the step of preheating said so-collected material.

7. The process of claim 1 including the step of forming the countercurrently flowing gas stream by mixing the fuel with primary oxygen-containing gas and igniting said so-formed mixture.

References Cited in the file of this patent

UNITED STATES PATENTS

| | | |
|---|---|---|
| 1,158,371 | Carnie | Oct. 26, 1915 |
| 1,536,702 | Chase et al. | May 5, 1925 |
| 1,557,873 | Pike | Oct. 20, 1925 |
| 1,562,207 | Croll | Nov. 17, 1925 |
| 1,849,492 | Larmour et al. | Mar. 15, 1932 |
| 1,859,926 | Larmour et al. | May 24, 1932 |
| 1,987,485 | Mercelis | Jan. 8, 1935 |
| 2,015,866 | Nielsen | Oct. 1, 1935 |
| 2,061,140 | Coiffu | Nov. 17, 1936 |
| 2,409,707 | Roetheli | Oct. 22, 1946 |
| 2,627,399 | De Vaney | Feb. 3, 1953 |
| 2,676,892 | McLaughlin | Apr. 27, 1954 |
| 2,948,521 | Heiligenstaedt | Aug. 9, 1960 |
| 2,960,323 | Ludin | Nov. 15, 1960 |
| 2,978,339 | Veatch et al. | Apr. 4, 1961 |

FOREIGN PATENTS

German application 1,036,745 (Kl. 80C 17/60) Aug. 14, 1958.